United States Patent [19]
Aoyama

[11] Patent Number: 4,555,603
[45] Date of Patent: Nov. 26, 1985

[54] GROUNDING SWITCH
[75] Inventor: Takanobu Aoyama, Hitachi, Japan
[73] Assignee: Hitachi, Ltd., Tokyo, Japan
[21] Appl. No.: 517,403
[22] Filed: Jul. 26, 1983
[30] Foreign Application Priority Data
  Jul. 26, 1982 [JP] Japan ................. 57-130081
[51] Int. Cl.[4] ............................. H01H 33/16
[52] U.S. Cl. .................... 200/144 AP; 200/145; 200/148 B
[58] Field of Search .................. 200/144 AP, 145
[56] References Cited
  FOREIGN PATENT DOCUMENTS
  670082 10/1964 Italy ................ 200/144 AP Primary Examiner—Robert S. Macon
Attorney, Agent, or Firm—Antonelli, Terry & Wands

[57] ABSTRACT

A grounding switch which includes a resistance contact unit and a short circuiting contact unit accommodated in a single sheath or casing. A movable contact of the short circuiting contact unit is connected to a movable contact of the resistance contact unit and a fixed contact of the short circuiting contact unit is grounded. A resistor is connected between the movable contact of the resistance contact unit and fixed contact of the short circuiting contact and is temporarily inserted into a main power circuit when the resistance contact unit is closed. The resistance contact unit and resistor are arranged on parallel axes in the same sheath.

15 Claims, 6 Drawing Figures

GROUNDING SWITCH

BACKGROUND OF THE INVENTION

The present invention relates to a switch construction and, more particularly, to a grounding switch for earthing a charge stored on a power transmitting line circuit.

Generally, a grounding switch includes a resistance contact unit, a short circuiting contact unit, and a resistor connected in parallel with the short circuiting contact unit. The parallel circuit of the short circuiting contact unit and the resistor is constructed in series with a resistance contact unit.

In grounding switches of the aforementioned type, in advance of a grounding of the power transmission line circuit, the resistance contact unit is first closed so as to ground the power circuit through the resistor, and then the short circuiting contact unit is closed to short circuit the resistor and to ground the power circuit. The reason the power circuit is grounded through the resistor stems from the fact that, if any residual charge remains on the power circuit, the circuit suffers a dielectric breakdown by a switching surge.

In previously proposed grounding switch constructions, the resistance contact unit and the short circuiting contact unit are arranged on the same axis so that an axial length of the sheath or casing accommodating the units is relatively long. Additionally, in the proposed grounding switch units, another sheath or casing must be provided to accommodate the resistor thereby complicating the construction of the grounding switch as well as increasing the overall total cost thereof.

SUMMARY OF THE INVENTION

The aim underlying the present invention essentially resides in providing a grounding switch for grounding a charge of a power transmission line circuit, which switch is extremely compact in size.

In accordance with advantageous features of the present invention, a grounding switch, including a resistance contact unit and a short circuiting contact unit, are arranged along parallel axes in the same sheath or casing.

Advantageously, in accordance with further features of the present invention, a dielectric plate is mounted in the sheath or casing with a resistor being rigidly fixed to the dielectric plate at one end thereof and grounded at the other end thereof. A current collector may be mounted on the dielectric plate and be electrically connected to one end of the resistor. A first movable contact is slidably connected to the current collector with a first fixed contact being mounted in opposition to the first movable contact in the sheath or casing. A conductor plate is connected to the first movable contact, with a second movable contact being connected to the conductor. The second movable contact is movable in a direction parallel to that of the movement of the first movable contact.

The grounding switch of the present invention also advantageously includes a second fixed contact mounted in opposition to the second movable contact on the dielectric plate, with the second fixed contact being grounded and spaced from the second movable contact at a distance greater than a distance between the first movable and fixed contacts.

A drive means is provided for driving the movable contacts, with the drive means being formed, for example, as a link means interposed between a drive and the first and second movable contacts.

Advantageously, the resistor of the present invention extends in a moving direction of the first and second movable contacts and the second fixed contact is grounded through a conductor and a grounding plate, with the conductor and grounding plate being detachably connected to each other on an insulating plate fastened to the sheath or casing.

Accordingly, it is an object of the present invention to provide a grounding switch for enabling a grounding of a charge stored in a power transmission line circuit which avoids, by simple means, shortcomings and disadvantages encountered in the prior art.

Another object of the present invention resides in providing a grounding switch for grounding a charge stored on a power transmission line circuit which is simple in construction and therefore relatively inexpensive to manufacture.

Yet another object of the present invention resides in providing a grounding switch for grounding or earthing a charge stored on a power transmission line circuit which is of a small compact size.

A still further object of the present invention resides in providing a grounding switch for grounding or earthing a charge stored on a power transmission line circuit which enables an accommodation of a resistance contact unit, a short circuiting unit, and a resistor in a single casing or sheath in an extremely simple manner.

Another object of the present invention resides in providing a grounding switch for earthing or grounding a charge stored on a power transmission line circuit which functions reliably under all operating conditions.

These and other objects, features, and advantages of the present invention will become more apparent from the following description when taken in connection with the accompanying drawings which show, for the purposes of illustration only, several embodiments in accordance with the present invention.

DETAILED DESCRIPTION OF THE INVENTION

Figure 1:
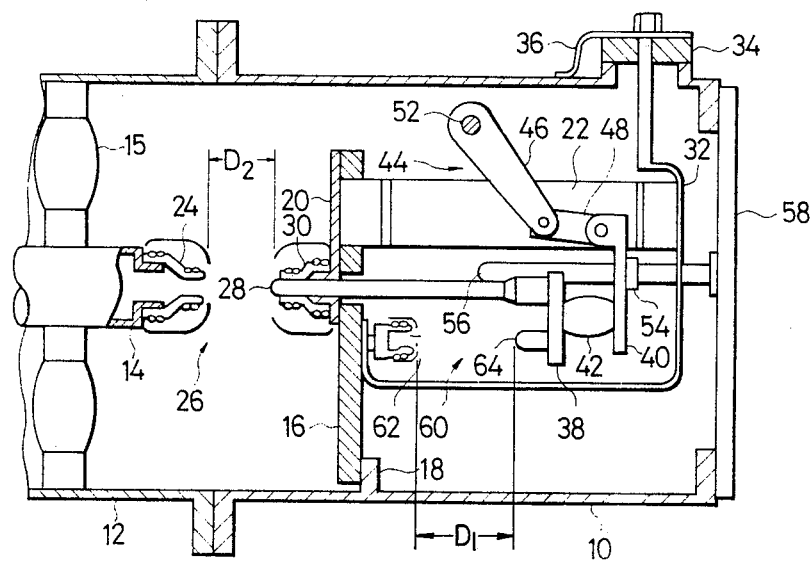
FIG. 1 is a cross-sectional view of a grounding switch constructed in accordance with the present invention, with a resistance contact unit in an open position.

Referring now to the drawings wherein like reference numerals are used throughout the various views to designate like parts and, more particularly, to FIG. 1, according to this figure, a sheath or casing 10 is disposed coaxially to and connected with a further sheath or casing 12 containing therein a conductor 14 of a main power circuit, with the conductor 14 being carried by insulating parts or members 15. A dielectric plate 16 is fixed to an inner flange 18 of the sheath 10 and a conductor plate 20 is fixed along one surface of the dielectric plate 16. One end of a resistor 22 is rigidly fixed or connected to the conductor plate 20. A fixed contact 24 of a resistance contact unit generally designated by the reference numeral 26 is fitted or secured to the end of the conductor 14 and a movable contact 28 of the resistance contact unit 26 facing the contact 24, is arranged in parallel with the resistor 22 and is in contact with a current collector 30. The current collector 30 is connected to the conductor plate 20, and the movable contact 28 is electrically connected to one end of the resistor 22 through the current collector 30. A conductor 32 is connected to the other end of the resistor 22, with the conductor 32 extending through the sheath or casing 10 by way of an insulating plate 34. Since the conductor 32 can be electrically insulated from the sheath or casing 10 by removing a grounding plate 36, it may be used as a terminal for measuring, for example, contact resistance or dielectric resistance.

The movable contact 28 is fixed to a conductor plate 38, with the conductor plate 38 being connected to a driving plate 40 through an insulating member 42. The driving plate 40 is connected to one end of a link mechanism generally designated by the reference numeral 44 formed, for example, of a plurality of links 46, 48, with the other end of the link mechanism 44 being connected to the driving shaft 52.

The driving shaft 52 is rotated by a conventional drive means (not shown) which is introduced into the sheath or casing 10 in such a manner so as to maintain the interior of the sheath or casing 10 air tight or hermetically sealed. The rotation of the driving shaft 52 is transformed into opening and closing forces between the movable contacts 28 and the fixed contact 24 through the links 46, 48 of the link mechanism 44.

A guide 54 is fixed to the driving plate 40 and a guide rod 56 is fixed to a lid 58 of the sheath or casing 10. The guide 54 is adapted to be reciprocated together with the driving plate 40 on the guide rod 56. The operation or rotation of the driving shaft 52 is transmitted to the driving plate 40 through the link mechanism 44 whereby the rotary motion of the shaft 52 is converted to a linear translatory movement through the guide 54 and guide rod 56.

A short circuiting contact unit generally designated by the reference numeral 60 includes a fixed contact 62 and a movable contact 64, with the short circuiting contact unit 60 being disposed between the conductor plate 38 and the insulating plate 16 and extending along an axis parallel to the resistance contact unit 26. The fixed contact 62 is connected to the conductor 32 and grounded through the grounding plate 36, with the movable contact 64 of the short circuiting unit 60 being connected to the movable contact 28 through the conductor plate 38.

A distance $D_1$ between the fixed contact 62 and the movable contact 64 of the short circuiting contact unit 60 is larger than a distance $D_2$ between the fixed contact 24 and the movable contact 29 of the resistance contact unit both at full open positions.

Figure 4:
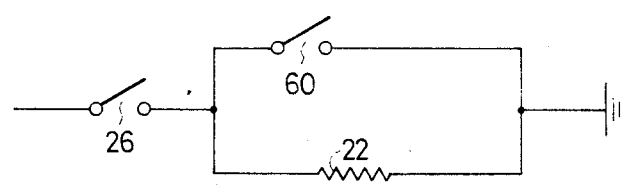
FIG. 4 is a circuit diagram of the grounding switch of FIG. 1.

The fixed contact 24 and movable contact 28 of the resistance contact unit 26, the current collector 30, and the fixed contact 62 and movable contact 64 of the short circuiting contact unit 60, are disposed along parallel axes, with the resistor 22 also being disposed in parallel to the longitudinal axes of the resistance contact unit 26 and short circuiting contact unit 60. With both the resistance contact unit 26 and short circuiting contact unit 60 of the grounding switch being turned off, the circuit diagram would corresponds to the circuit diagram illustrated in FIG. 4.

Figure 2:
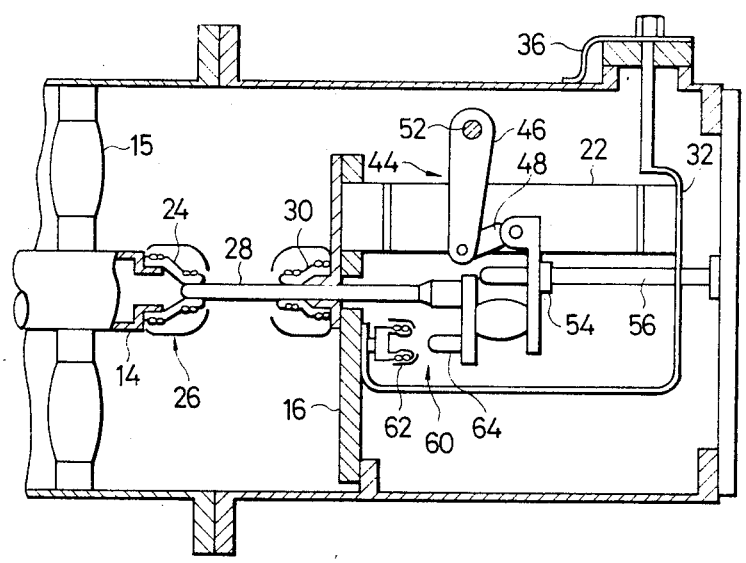
FIG. 2 is a cross-sectional view of the grounding switch of FIG. 1, with the resistance contact unit in the closed position.
Figure 3:
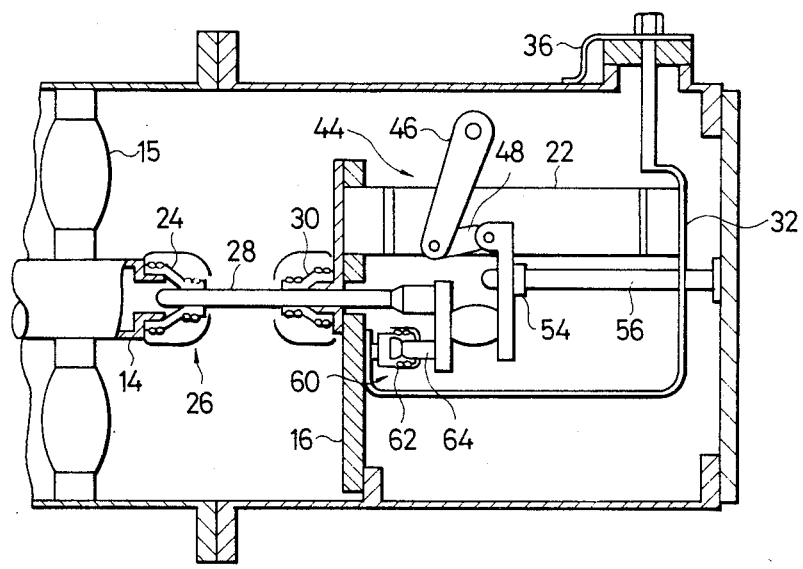
FIG. 3 is a cross-sectional view of the grounding switch of FIG. 1, with both the resistance contact unit and short circuiting contact unit in a closed position.
Figure 5:
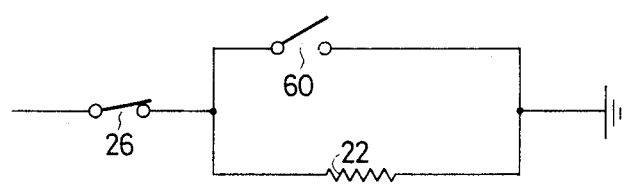
FIG. 5 is a circuit diagram of the grounding switch of FIG. 2.
Figure 6:
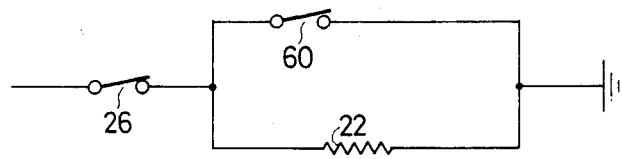
FIG. 6 is a circuit diagram of the grounding switch of FIG. 3.

When the link 46 of the link mechanism 44 is rotated clockwise by rotation of the driving shaft 52, first the fixed contact 24 and the movable contact 28 are brought into contact with each other. As a result, as shown most clearly in FIGS. 2 and 5, the conductor 14 is grounded through the resistor 22 thereby discharging any residual charge in the main power circuit. As the operation further proceeds, the movable contact 64 is then brought into contact with the fixed contact 62 of the short circuiting contact unit 60 so that, as shown in FIGS. 3 and 6, the conductor 14 is directly grounded.

Since, as noted above, the resistance contact unit 26 and the short circuiting unit 60 are disposed along parallel axes, the resistor 22 along with the short circuiting contact unit 60 and resistance contact unit 26 can be accommodated in the same sheath or casing 10 and by virtue of the parallel disposal of these elements, the axial length of the sheath or casing 10 can be considerably reduced. Moreover, it is unnecessary to provide a separate sheath or casing for accommodating the resistor 22. Thus, the total number of sheaths or casings for the grounding switch can be reduced and, as a whole, the grounding switch is reduced in size and simplified in construction.

While I have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

I claim:

1. A grounding switch comprising:
    a resistance contact means having a fixed contact means connected to a main power circuit conductor and a movable contact means;
    a resistor means being grounded at one end and being connected to the movable contact means at the other end; and
    short circuiting contact means having a grounded fixed contact means and a movable contact means connected to the movable contact means of said resistance contact means, said short circuiting contact means being arranged so as to extend in parallel with said resistance contact means in a direction of movement of the movable contact means of said resistance contact means.

2. A grounding switch as claimed in claim 1, wherein a distance between the fixed contact means and movable contact means of the resistance contact means is less than a distance between the fixed contact means and movable contact means of the short circuiting contact means.

3. A grounding switch as claimed in claim 1, wherein said resistor means extends substantially in parallel to the moving direction of the movable contact means of said short circuiting contact means and said resistance contact means.

4. A grounding switch as claimed in claim 1, further comprising a single sheath means for accommodating said resistance contact means, said short circuiting contact means, and said resistor means.

5. A ground switch as claimed in claim 4, further comprising a dielectric plate means mounted in said sheath means, the other end of said resistor means being fixed to said dielectric plate means and the one end being grounded, a current collector means mounted on said dielectric plate means and electrically connected to said first end of said resistor means, said movable contact means of said resistance contact means being slidably connected to said current collector means, and said fixed contact means is mounted in said sheath means in opposition to said movable contact means of said resistance contact means.

6. A ground switch as claimed in claim 5, further comprising a conductor plate means connected to said movable contact means of said resistance contact means, said movable contact means of said short circuiting contact means is connected to said conductor plate means in such a manner that said movable contact means of said resistance contact means and said short circuiting contact means are movable in a direction parallel to each other.

7. A ground switch as claimed in claim 6, wherein said fixed contact means of said short circuiting contact means is disposed on said dielectric plate means at a position opposite said movable contact means of said short circuiting contact means, means are provided for grounding said fixed contact means of said short circuiting contact means, and wherein a distance between said movable contact means and fixed contact means of said resistance contact means is less than a distance between said movable contact means and fixed contact means of said short circuiting contact means.

8. A ground switch as claimed in claim 7, further comprising means for moving the movable contact means of said resistance contact means and said short circuiting contact means.

9. A ground switch as claimed in claim 8, wherein said means for moving includes a link means interposed between a driving means and both of said movable contact means.

10. A ground switch as claimed in claim 4, further comprising a conductor plate means connected to said movable contact means of said resistance contact means, said movable contact means of said short circuiting contact means is connected to said conductor plate means in such a manner that said movable contact means of said resistance contact means and said short circuiting contact means are movable in a direction parallel to each other.

11. A ground switch as claimed in claim 4, wherein said fixed contact means of said short circuiting contact means is disposed on a dielectric plate means mounted in said sheath means, means are provided for grounding said fixed contact means of said short circuiting contact means, and wherein a distance between said movable contact means and fixed contact means of said resistance contact means is less than a distance between said movable contact means and fixed contact means of said short circuiting contact means.

12. A grounding switch comprising:
a sheath means;
a dielectric plate means mounted in said sheath means;
a resistor means rigidly fixed to said dielectric plate means at one end thereof and grounded at the other end thereof;
a current collector means mounted on said dielectric plate means and electrically connected to the one end of said resistor means;
a first movable contact means slidably connected to said current collector means;
a first fixed contact means mounted in opposition to said first movable contact means in said sheath means;
a conductor plate means connected to said first movable contact means;
a second movable contact means connected to said conductor plate means, said second movable contact means being movable in a direction substantially parallel to that of a movement of said first movable contact means;
a second fixed contact means mounted on said dielectric in opposition to said second movable contact means, said second fixed contact means being grounded and a distance between said second movable contact means and said second fixed contact means is greater than a distance between said first movable contact means and said first fixed contact means; and
a link mechanism for moving said first and second movable contact means with respect to said first and second fixed contact means.

13. A grounding switch as claimed in claim 12, wherein said resistor means extends axially in a moving direction of said first and second movable contact means.

14. A grounding switch as claimed in claim 12, wherein said second fixed contact means is grounded through a conductor means and a grounding plate means, said conductor means and grounding plate means being detachably connected to each other on an insulating plate fastened to said sheath means.

15. A grounding switch for grounding a main power circuit to the ground comprising:
a resistance contact unit having a fixed contact and a movable contact arranged in a same line, the fixed contact of said resistance contact unit connected to the main power circuit;
a short circuit contact unit having a fixed contact and a movable contact arranged in a same line, and further arranged in parallel with said resistance contact unit, a distance between the fixed contact and the movable contact of said resistance contact unit is less than a distance between the fixed contact and the movable contact of said short circuiting contact unit at their full open positions;
a dielectric plate supporting the fixed contact of said short circuiting contact unit on one side thereof;
a current collector member supported on the other side of said dielectric plate and slidably supporting the movable contact of said resistance contact unit which is movable through said dielectric plate toward the fixed contact thereof;
a conductor plate for supporting and moving both the movable contacts of said resistance contact unit and of said short circuiting contact unit;
a grounding conductor for grounding the fixed contact of said short circuiting contact unit to the ground;
a resistor supported on the one side of said dielectric plate, arranged in parallel with said resistance contact unit and said short circuiting contact unit and connected between said current collector and said ground conductor; and
a driving mechanism coupled to said conductor plate.

* * * * *